United States Patent
Ninomiya et al.

(10) Patent No.: US 7,569,295 B2
(45) Date of Patent: *Aug. 4, 2009

(54) FUEL CELL UNIT AND STATE DISPLAY CONTROL METHOD

(75) Inventors: Ryoji Ninomiya, Tachikawa (JP); Nobuo Shibuya, Hiratsuka (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 722 days.

This patent is subject to a terminal disclaimer.

(21) Appl. No.: 10/790,240

(22) Filed: Mar. 2, 2004

(65) Prior Publication Data

US 2004/0224198 A1 Nov. 11, 2004

(30) Foreign Application Priority Data

Mar. 4, 2003 (JP) ............................. 2003-057467

(51) Int. Cl.
*H01M 8/04* (2006.01)
*G05D 3/00* (2006.01)

(52) U.S. Cl. ............................. 429/23; 429/12; 429/22; 700/286

(58) Field of Classification Search ........................ None
See application file for complete search history.

(56) References Cited

U.S. PATENT DOCUMENTS

| 4,968,566 A | 11/1990 | Lersch et al. |
| 2001/0052433 A1 | 12/2001 | Harris et al. |
| 2002/0055029 A1 | 5/2002 | Hayashi et al. |
| 2003/0082426 A1* | 5/2003 | Bullock et al. ................ 429/34 |
| 2003/0143447 A1 | 7/2003 | Akimoto et al. |
| 2004/0170876 A1* | 9/2004 | Ozeki ........................... 429/22 |

FOREIGN PATENT DOCUMENTS

| EP | 1 306 918 A2 | 5/2003 |
| JP | 03-250564 | 11/1991 |
| JP | 4-172539 | 6/1992 |
| JP | 09-171842 A | 6/1997 |
| JP | 9-223512 | 8/1997 |
| JP | 2002-175827 | 6/2002 |
| JP | 2002-240535 | 8/2002 |
| JP | 2002-246037 | 8/2002 |
| JP | 2002-280035 | 9/2002 |
| JP | 2003-303609 | 10/2003 |
| JP | 2003-323911 A | 11/2003 |
| JP | 2004-111212 | 4/2004 |

OTHER PUBLICATIONS

Hironosuki Ikeda, "All About Fuel Cells," Nihonjitsugyo Publishing Co., Ltd., p. 216-217, (Aug. 20, 2001).

(Continued)

*Primary Examiner*—John S Maples
(74) *Attorney, Agent, or Firm*—Pillsbury Winthrop Shaw Pittman

(57) ABSTRACT

A fuel cell unit for supplying electric power to an electronic apparatus includes a DMFC that generates electric power using methanol as fuel. A microcomputer examines whether or not the fuel cell unit has been installed in the electronic apparatus. When the fuel cell unit has been installed in the electronic apparatus, the microcomputer visually informs the user, using LEDs, of the operating state of the DMFC detected by various sensors, including an installation and removal sensor, a liquid level sensor, a temperature sensor, and an acceleration sensor.

11 Claims, 5 Drawing Sheets

OTHER PUBLICATIONS

European Search Report, dated Jun. 29, 2004 for Patent Application No. 04004527.0-2119.
Japanese Office Action dated May 24, 2005 for Appln. No. 2003-057467.
Japanese Office Action dated Aug. 23, 2005 for Appln. No. 2003-057467.
Japanese Office Action dated Jan. 17, 2006 for Appln. No. 2003-057467.

* cited by examiner

|   | LED (orange) blinking factors |
|---|---|
| 1 | Inclined |
| 2 | High temperature outside DMFC activation temperature range |
| 3 | High temperature outside DMFC continuous temperature range |
| 4 | Air pump or liquid supply pump is not rotating |
| 5 | The amount of liquid in the mixing tank is at a high level for two seconds or longer continuously |

FIG. 5

|   | LED (green) blinking factors |
|---|---|
| 1 | Fuel cartridge has not been installed or removed |
| 2 | The remaining amount in the fuel cartridge is less than the warning remaining amount |
| 3 | Low temperature outside DMFC activation temperature range |
| 4 | Low temperature outside DMFC continuous temperature range |
| 5 | The amount of liquid in the mixing tank is at a low level for two seconds or longer continuously |

FIG. 6

FUEL CELL UNIT AND STATE DISPLAY CONTROL METHOD

CROSS-REFERENCE TO RELATED APPLICATIONS

This application is based upon and claims the benefit of priority from prior Japanese Patent Application No. 2003-057467, filed Mar. 4, 2003, the entire contents of which are incorporated herein by reference.

BACKGROUND OF THE INVENTION

1. Field of the Invention

This invention relates to a system management technology for electronic apparatuses using a battery composed of a fuel cell that generates electric power using methanol as fuel.

2. Description of the Related Art

In recent years, various types of battery-powered portable electronic apparatuses, such as portable information terminals called personal digital assistants (PDAs) or digital cameras, have been developed and widely used.

In addition, environmental problems have lately attracted considerable attention, and environment-friendly batteries are now being actively developed. One well-known battery of this type is a direct methanol fuel cell (hereinafter, referred to as DMFC).

In the DMFC, methanol supplied as fuel reacts with oxygen, thereby producing electric energy. The DMFC has such a structure wherein an electrolyte is sandwiched between two electrodes composed of porous metal or carbon (e.g., see Hironosuke Ikeda "All about Fuel Cells," Nihonjitsugyo Publishing Co., Ltd, Aug. 20, 2001, pp. 216-217). Since DMFCs do not generate toxic substances, there is a strong demand that they be used in the above-mentioned electronic apparatus.

In the car industry, a trial of DMFCs has already been made. For example, there has been a system which provides a warning on such a display as a speedometer, when the fuel cell develops trouble, such as a gas leak (e.g., see Jpn. Pat. Appln. KOKAI Publication No. 2002-240535).

Here, consider a case where a fuel cell provided in, for example, a notebook personal computer has developed trouble, such as a gas leak. In this case, use of the method disclosed in Jpn. Pat. Appln. KOKAI Publication No. 2002-240535 enables the user to be informed that the fuel cell has developed trouble, by providing a warning on the display of the computer body.

In this case, however, the user knows only the development of the trouble and is unaware of the state of the actual fuel cell. Further, When a notice of the state of the fuel cell is given only on the display of the computer body side, this increases the burden on the computer body side.

BRIEF SUMMARY OF THE INVENTION

According to an embodiment of the present invention, a fuel cell unit comprises a fuel cell, a sensing unit configured to sense an abnormal state of the fuel cell, and a display unit configured to notify a user of the abnormal state when the sensing unit has sensed an abnormal state.

BRIEF DESCRIPTION OF THE SEVERAL VIEWS OF THE DRAWING

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 5 is a table to help explain the phenomena of which the user is visually notified by the fuel cell unit of the embodiment blinking an LED (orange);

FIG. 6 is a table to help explain the phenomena of which the user is visually notified by the fuel cell unit of the embodiment blinking an LED (green)

DETAILED DESCRIPTION OF THE INVENTION

Hereinafter, referring to the accompanying drawings, an embodiment of the present invention will be explained.

Figure 1:
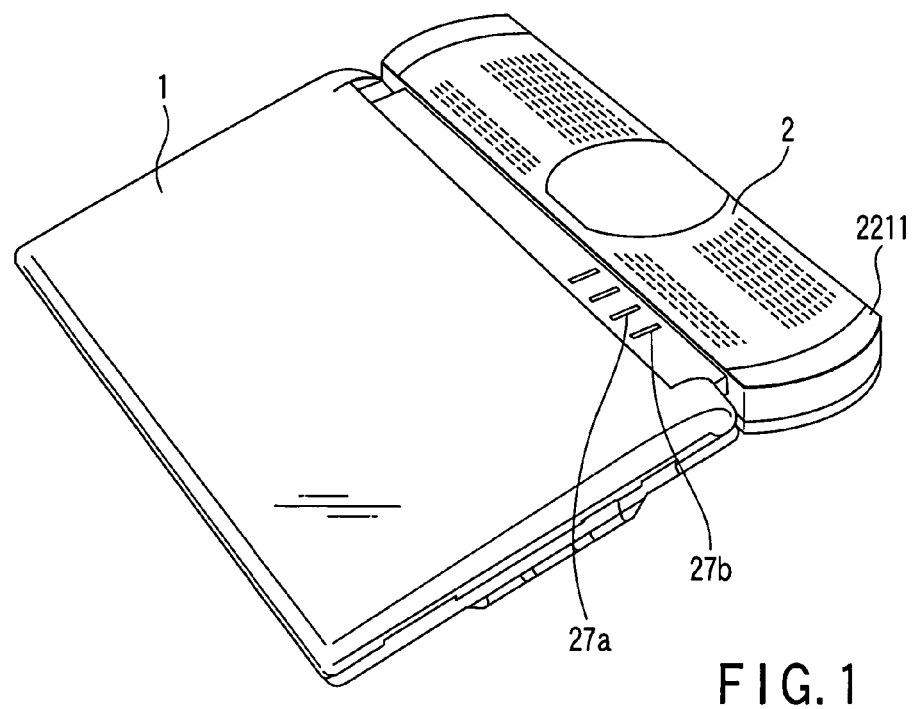
FIG. 1 shows an outward appearance of an electronic apparatus system according to an embodiment of the present invention.

FIG. 1 shows an outward appearance of an electronic apparatus system according to an embodiment of the present invention.

As shown in FIG. 1, the electronic apparatus system comprises an electronic apparatus 1, such as a notebook personal computer, and a fuel cell unit 2 which can be installed on and removed from the back of the electronic apparatus 1. The fuel cell unit 2, which is a power supply unit for supplying power to operate the electronic apparatus 1, includes a DMFC that causes methanol supplied as fuel to react with oxygen to produce electric energy. Methanol, fuel for the DMFC, is supplied from a cartridge fuel tank 2211 detachably housed in the fuel cell unit 2. On the side of the fuel cell unit 2, there are provided LEDs 27a, 27b for notifying the user of the present operating state.

Figure 2:
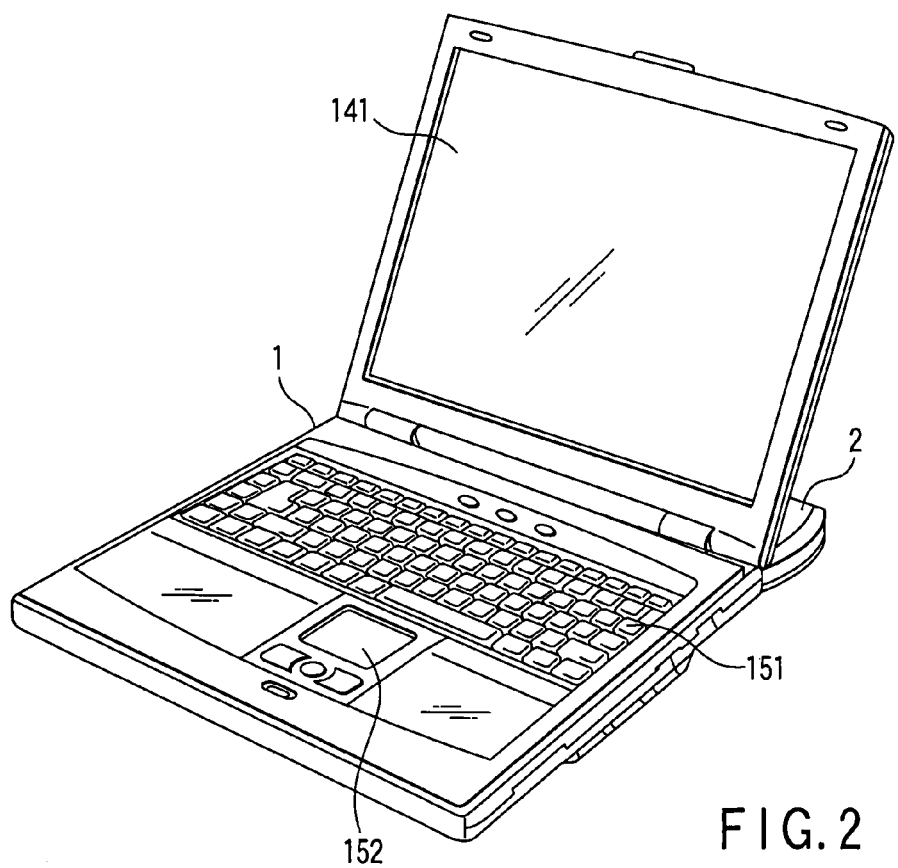
FIG. 2 shows an outward appearance of an electronic apparatus system, with the top cover of the electronic apparatus of FIG. 1 opened.

FIG. 2 shows an outward appearance of the electronic apparatus system, with the top cover of the electronic apparatus opened.

As shown in FIG. 2, the top cover of the electronic apparatus 1 is provided on the body part by a hinge mechanism in such a manner that it can be opened and closed freely. On its inner wall surface, a liquid crystal display (LCD) 141 is provided. In the body part, there are provided a keyboard 151 for entering characters, symbols, and the like into the display screen appearing on the LCD 141 and a pointing device 152 for moving a mouse cursor displayed to point at a given place on the LCD 141 and pointing out a selection.

Figure 3:
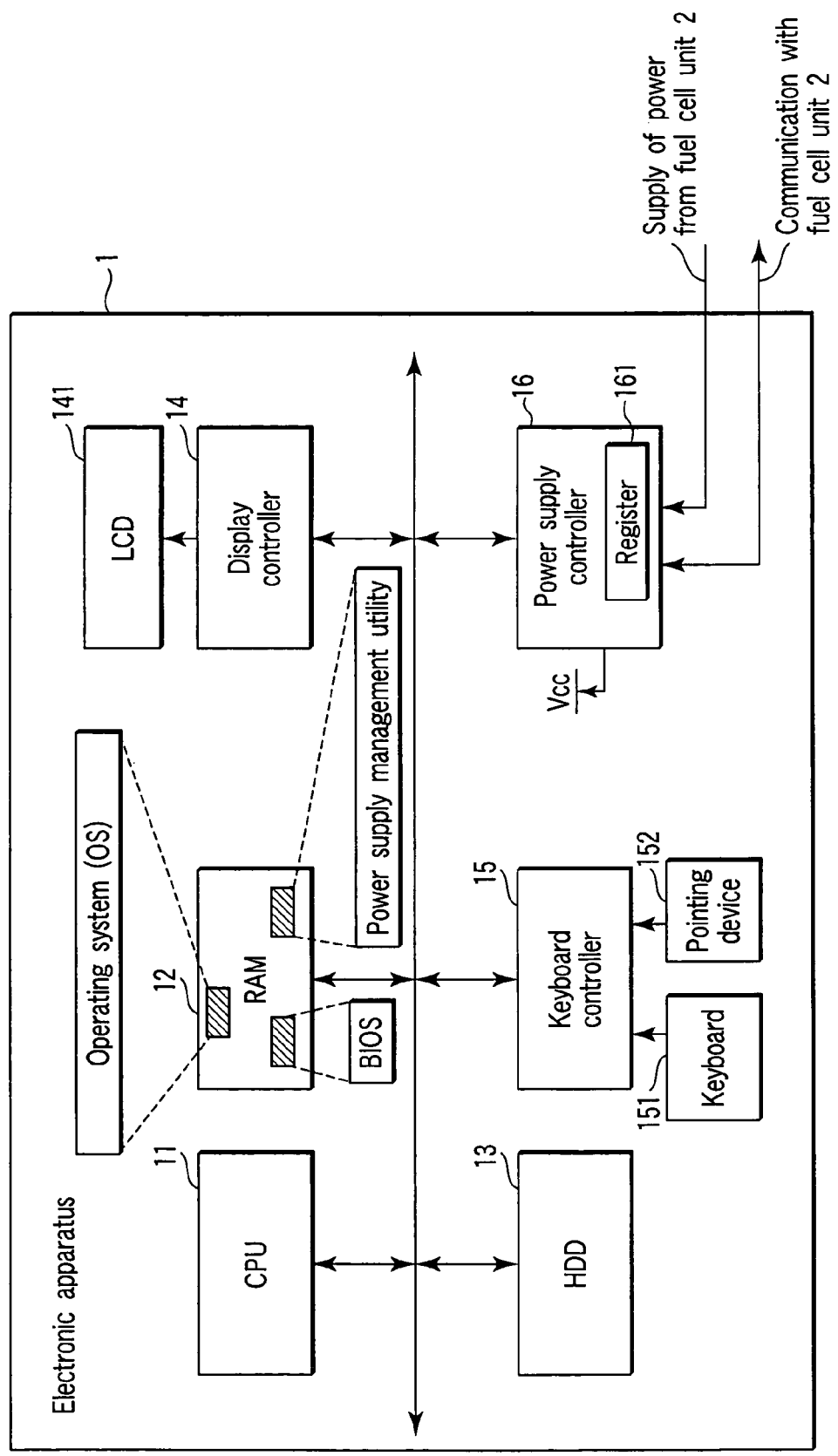
FIG. 3 schematically shows the configuration of the electronic apparatus of the embodiment.

FIG. 3 shows a schematic configuration of the electronic apparatus 1.

As shown in FIG. 3, in the electronic apparatus 1, a CPU 11, a RAM 12, an HDD 13, a display controller 14, a keyboard controller 15, and a power supply controller 16 are connected to a system bus.

The CPU 11, which supervises control of the operation of the entire electronic apparatus 1, executes various types of programs, including an operating system, basic input/output system (BIOS), utility software, and application software stored in the RAM 12. A power supply management utility explained later is one of a plurality of utility software programs.

The RAM 12, which is a storage medium acting as a main memory for the CPU 11, stores various programs executed by the CPU 11 and various types of data used in those programs.

The HDD 13, which is a storage medium acting as an auxiliary memory for the electronic apparatus 1, stores various programs and various types of data in large amounts.

The display controller 14, which is a device that handles the output side of a user interface provided by the electronic apparatus 1, performs control of the screen data processed by the CPU 11 so as to display the data on the LCD 141. The keyboard controller 15, which is a device that handles the input side of the user interface provided by the electronic apparatus 1, digitizes the operation of the keyboard 151 or pointing device 152 and transmits the result via an internal register to the CPU 11.

The power supply controller 16, which supplies operating power to each section of the electronic apparatus 1, has the function of not only receiving power from the fuel cell unit 2 but also communicating with a microcomputer 21 (described later) of the fuel cell unit 2. In addition, the power supply controller 16 includes a register 161 for storing status information representing the state of the fuel cell unit 2. Referring to the status information, the power supply management utility can know the state of the fuel cell unit 2.

Figure 4:
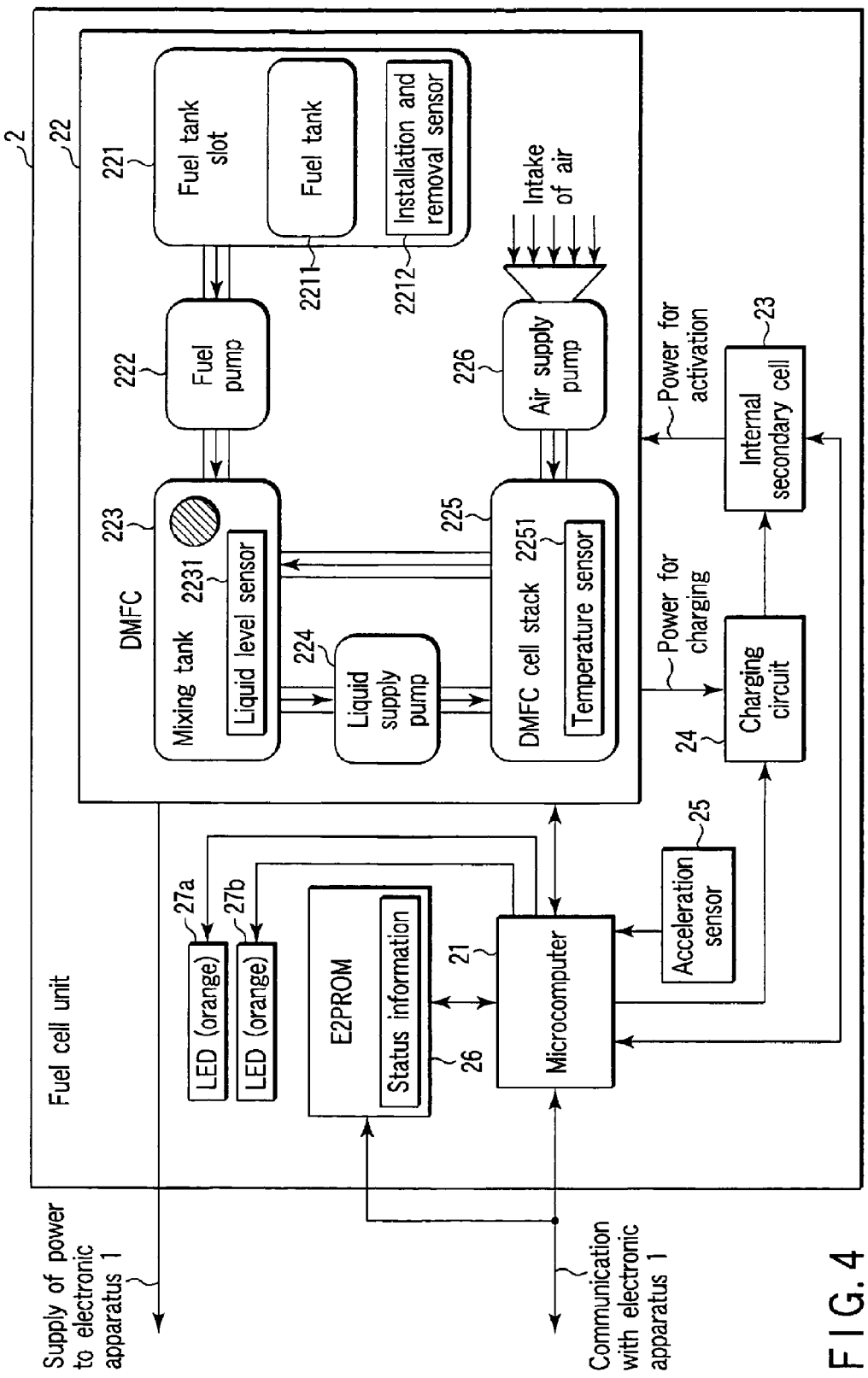
FIG. 4 schematically shows the configuration of the fuel cell unit according to the embodiment.

FIG. 4 shows a schematic configuration of the fuel cell unit 2.

As shown in FIG. 4, the fuel cell unit 2 has a microcomputer 21, a DMFC 22, an internal secondary cell 23, a charging circuit 24, an acceleration sensor 25, an E2PROM 26, and LEDs 27a, 27b.

The microcomputer 21, which supervises control of the operation of the entire fuel cell unit 2, communicates with the power supply controller 16 of the electronic apparatus 1. The microcomputer 21 has the function of determining whether or not the fuel cell unit 2 has been installed in the electronic apparatus 1, depending on the presence or absence of the connection of a data signal line for the communication.

Furthermore, the microcomputer 21, which also functions as a power supply controller in the fuel cell unit 21, performs control so as to supply the power of the internal secondary cell 23 to the DMFC 22 at the activation of the DMFC 22. When the DMFC 22 can supply power and the internal secondary cell 23 is in the low battery state, the microcomputer 21 performs control so as to charge the internal secondary cell 23 with the power of the DMFC 22.

The DMFC 22 is composed of a fuel tank slot 221, a fuel pump 222, a mixing tank 223, a liquid supply pump 224, a DMFC cell stack 225, and an air supply pump 226.

The fuel tank slot 221, which is a slot for housing a cartridge fuel tank 2211 in such a manner that the tank 2211 can be installed and removed freely, has an installation and removal sensor 2212 for detecting the presence or absence of the installation of the fuel cell tank 2211. Methanol in the fuel cell tank 2211 housed in the fuel cell tank slot 221 is fed to the mixing tank 223. The methanol is diluted to, for example, 10% concentration by the water fed back from the DMFC cell stack 225.

The mixing tank 223, which holds the dilute methanol, has a liquid level sensor 2231 for sensing whether or not the amount of the liquid falls in a suitable amount range. It is assumed that 15 to 90% of the holding capacity of the mixing tank 223 is within the suitable amount range. When the liquid level sensor 2231 has sensed that the amount of the liquid in the mixing tank 223 has gone outside the range for two seconds or longer continuously, the microcomputer 21 determines that some abnormality has occurred. In addition, the mixing tank 223 has the function of vaporizing the unnecessary part of the water returned from the DMFC cell stack 225, thereby discharging the unnecessary water outside the DMFC 22.

The liquid supply pump 224 feeds the methanol in the mixing tank 223 to the DMFC cell stack 225. To the DMFC cell stack 225, the air taken in by the air supply pump 226 is fed. Then, the methanol fed by the liquid supply pump 224 reacts with oxygen in the air fed by the air supply pump 226 in the DMFC cell stack 225, thereby generating power supplied to the electronic apparatus 1. At this time, water is also produced. This water is returned to the mixing tank 223 through a return flow path.

The DMFC cell stack 225 has a temperature sensor 2251 for sensing whether or not the temperature in the stack falls in a suitable temperature range. It is assumed that the suitable temperature in the DMFC cell stack 225 at the activation of the DMFC 22 is 5 to 40° C. and the suitable temperature in the DMFC cell stack 225 during the operation of the DMFC 22 is 50 to 90° C. At the activation of the DMFC 22 and during its operation, the microcomputer 21 monitors whether or not the temperature in the stack falls in the respective suitable temperature ranges.

The internal secondary cell 23, which is a lithium ion cell that can be charged and discharged repeatedly, supplies power needed by an auxiliary mechanism, including the fuel pump 222, liquid supply pump 224, and air supply pump 225, during the time from when the DMFC 22 starts to operate until more than a specific amount of power is generated. In addition, the internal secondary cell 23 may be charged by the charging circuit 24 under the control of the microcomputer 21 by using the power generated by the DMFC 22.

The acceleration sensor 25 is a sensor for sensing whether or not the inclination of the fuel cell unit 2 is in a permitted angle range. It is assumed that the permitted range is an inclination of 30 degrees or less. If this range has been exceeded, the microcomputer 21 determines that a warning to the user is necessary.

The E2PROM 26 is a memory device for storing status information indicating the state of the fuel cell unit 2. The microcomputer 21 records various states detected by various sensors, including the installation and removal sensor 2212, liquid level sensor 2231, temperature sensor 2251, and acceleration sensor 25, into the E2PROM 26 in the form of status information. In addition, the microcomputer 21 has the function of computing the remaining amount of fuel in the fuel tank 2211 according to the operating state of the DMFC 22. The microcomputer 21 also records the computed remaining amount into the E2PROM 26. Furthermore, the microcomputer 21 monitors whether or not the auxiliary mechanism, including the fuel pump 222, liquid supply pump 224, and air supply pump 226, is operating properly. For example, if the auxiliary mechanism has stopped abnormally, the microcomputer 21 records this as status information.

When updating the status information, the microcomputer 21 informs the power supply controller 16 of the electronic apparatus 1 of the update. For the power supply controller 16 to be able to refer to the area of the E2PROM 26 in which the status information is stored, the interface for the area is opened. When receiving the notice from the microcomputer 21, the power supply controller 16 reads the status information from the E2PROM 26 and stores it into the built-in register 161. At this time, the power supply controller 16 gives the CPU 11 an interrupt notice, thereby informing the power supply management utility of the update of the status information. Being informed of the update of the status information, the power supply management utility acquires the latest status information stored in the register 161 of the power supply controller 16 by way of the BIOS. The power supply management utility displays a message on the LCD 141 or carries out an error process if necessary. In addition, the microcomputer 21 may read the status information from the E2PROM 26 periodically. In this case, the microcomputer 21 reads the status information and, when the status has been changed, informs the CPU 11 of an interrupt. Then, the power management utility carries out processes suitably.

On the other hand, the fuel cell unit 2 displays the present operating state by use of the LEDs 27a, 27b independently of the electronic apparatus 1. Specifically, using the LEDs 27a, 27b, the microcomputer 21 visually informs the user of various states detected by various sensors, including the installation and removal sensor 2212, liquid level sensor 2231, temperature sensor 2251, and acceleration sensor 25.

FIG. 5 is a table illustrating phenomena visually notified to the user by blinking the LED (orange) 27a. FIG. 6 is a table illustrating phenomena visually notified to the user by blinking the LED (green) 27b.

When detecting any one of the phenomena listed in FIG. 5, the microcomputer 21 blinks the LED (orange) 27a. The principle of the detection is as follows:

(1) Inclined

The sensed data of the acceleration sensor 25 has exceeded 30 degrees.

(2) High Temperature Outside the DMFC Activation Temperature Range

The sensed data of the temperature sensor 2251 at the activation of the DMFC 22 has exceeded 40° C.

(3) High Temperature Outside the DMFC Continuous Temperature Range

The sensed data of the temperature sensor 2251 during the operation of the DMFC 22 has exceeded 90° C.

(4) The Air Pump or Liquid Supply Pump is not Rotating

The supply of air or methanol is stopped.

(5) The Amount of Liquid in the Mixing Tank is at a High Level for Two Seconds or Longer Continuously.

The sensed data of the liquid level sensor 2231 has exceeded 90% of the holding capacity of the mixing tank 223 for two seconds or longer continuously. Furthermore, when detecting any one of the phenomena listed in FIG. 6, the microcomputer 21 blinks the LED (green) 27b. The principle of the detection is as follows:

(1) The Fuel Cartridge has not been Installed or Removed

The sensed data of the installation and removal sensor 2212 is off (the fuel tank 2211 has not been installed in the fuel tank slot 221).

(2) The Remaining Amount in the Fuel Cartridge is Less than the Warning Remaining Amount The capacity at the time when the fuel tank 2211 is installed is assumed to be the full capacity. The value obtained by subtracting the product of the number of injections and the amount of one injection from the full capacity according to how many times the fuel was injected to supply fuel has fallen short of 10% of the full capacity.

(3) Low Temperature Outside the DMFC Activation Temperature Range

The sensed data of the temperature sensor 2251 at the activation of the DMFC 22 has dropped below 5° C.

(4) Low Temperature Outside the DMFC Continuous Temperature Range

The sensed data of the temperature sensor 2251 during the operation of the DMFC 22 has dropped below 50° C.

(5) The Amount of Liquid in the Mixing Tank is at a Low Level for Two Seconds or Longer Continuously.

The sensed data of the liquid level sensor 2231 has decreased below 15% of the holding capacity of the mixing tank 223 for two seconds or longer continuously.

The above notices are given using the LEDs 27a, 27b. For example, the LEDs 27a, 27b of the fuel cell unit are used to display a message that an error has occurred. The LCD 141 of the electronic apparatus 1 is used to display a detailed message about the error, thereby enabling the user to determine what kind of error has occurred. Depending on the situation, the electronic apparatus 1 may not make any message display at all. By doing this, the burden on the electronic apparatus 1 can be reduced. Since the types of errors that will possibly occur in the display on the LED 27a, 27b are limited, the user can roughly determine the type of an error.

Furthermore, the microcomputer 21 of the fuel cell unit 2 gives notices using the LEDs 27a, 27b independently of the electronic apparatus 1. By doing this, for example, when the remaining amount of fuel in the fuel tank 2211 has fallen below 10%, the fuel cell unit 2 may give a notice, whereas the electronic apparatus 1 may give a notice when the remaining amount has fallen below 3%. Specifically, when the remaining amount has deceased below 10%, the microcomputer 21 in the fuel cell unit 2 informs the power supply controller 16 of the fact. Then, the power supply controller 16 gives an interrupt notice to the CPU 11, thereby informing the power management utility that the remaining amount has fallen below 10%. However, the power management utility does not make a display on the LCD 141 at this stage. On the other hand, the microcomputer 21 in the fuel cell unit 2, when sensing that the remaining amount has decreased below 10%, blinks the LCD (green) 27b. When the electronic apparatus 1 continues to be used as it is and the remaining amount of fuel in the fuel tank 2211 has fallen below 3%, similar notices are given and the power supply management utility displays on the LCD 141 a message that the remaining amount of fuel has fallen below 3%. That is, about the same phenomenon, the electronic apparatus 1 and fuel cell unit 2 can give stepwise notices. This makes it possible for the user to use the electronic apparatus 1 more easily.

The microcomputer 21 of the fuel cell unit 2 gives notices using the LEDs 27a, 27b only when the fuel cell unit 2 has been installed in the electronic apparatus 1. For example, this prevents the waste of continuing to give notice that the remaining amount of fuel in the fuel tank 2211 has fallen below 10%, regardless of the fact that the electronic apparatus 1 has not been installed. In this case, the individual sensors (2212, 2231, 2251) may be controlled so as to do sensing only when their connection with the electronic apparatus 1 has been sensed. This will reduce the power consumed in the sensors. If a serious trouble has developed in the fuel cell unit 2 alone, a message about the trouble may be displayed, regardless of the connection with the electronic apparatus 1. As an example, consider a liquid leak in the fuel cell unit 2. For instance, a liquid leak sensor may be provided in the fuel cell unit 2, thereby sensing constantly whether or not there is any liquid leak.

Figure 7:
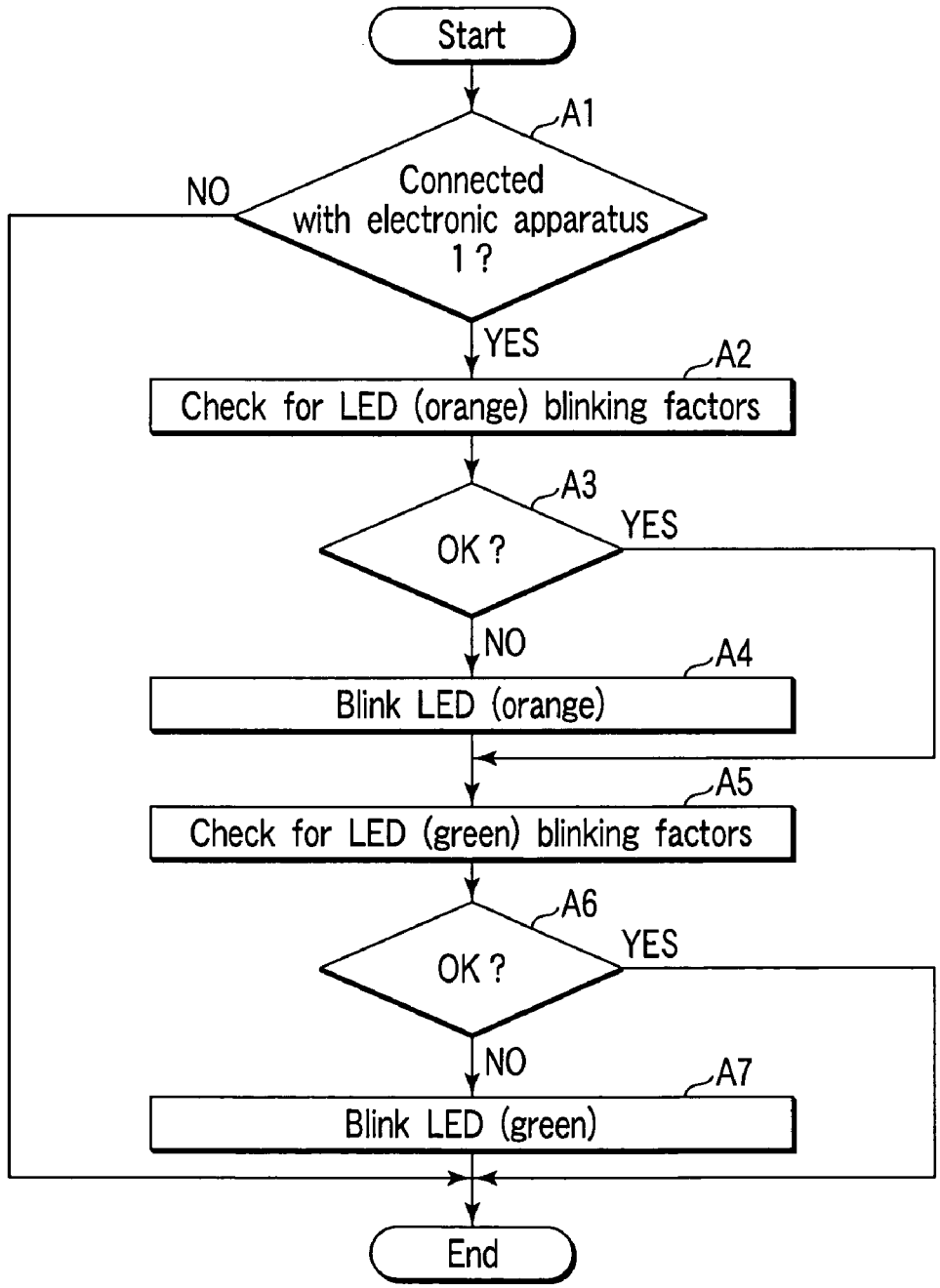
FIG. 7 is a flowchart for the sequence for state display control performed in the fuel cell unit of the embodiment.

FIG. 7 is a flowchart for the procedure for state display control executed at the fuel cell unit 2 of the electronic apparatus system.

First, the microcomputer 21 examines whether or not the fuel cell unit 2 has been installed in the electronic apparatus 1 (step A1). If it has been installed (YES in step A1), the microcomputer 21 examines whether or not a phenomenon needing the blinking of the LED (orange) 27a has occurred, on the basis of the sensed data from the various sensors, including the liquid level sensor 2231, temperature sensor 2251, and acceleration sensor 25 (step A3).

If a phenomenon needing the blinking of the LED (orange) 27a has occurred (NO in step A3), the microcomputer 21 blinks the LED (orange) 27a (step A3). In addition, the microcomputer 21 examines whether or not a phenomenon needing the blinking of the LED (green) 27b has occurred, on the basis of the sensed data from the various sensors, including the installation and removal sensor 2231, liquid level sensor 2231, and temperature sensor 2251 (step A5). Then, if a phenomenon needing the blinking of the LED (green) 27b has occurred (NO in step A6), the microcomputer 21b blinks the LED (orange) 27a (step A7).

The state display control process is shown in time sequence in the form of step A1 to A7. Actually, however, when a phenomenon needing the blinking of the LEDS 27a, 27b has taken place, the occurrence of the phenomenon triggers the execution of an event-driven process of blinking the LEDs 27a, 27b.

While in the embodiment, two LEDs 27a, 27b have been provided, a single LED capable of emitting a plurality of colored rays of light may be provided. Furthermore, a single-color LED may be provided and its lightening pattern may be changed, which enables the occurrence of a plurality of errors to be displayed.

That is, the electronic apparatus system, it is realized that various notices are given by using a display unit provided on the fuel cell side.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A fuel cell unit comprising:
   a fuel cell;
   an LED provided at the fuel cell unit and powered by a power source module provided in the fuel cell unit, the power source module including the fuel cell;
   a sensing module configured to sense an abnormal state of the fuel cell;
   a connection detecting module configured to detect a presence or absence of a connection with an electronic apparatus, the electronic apparatus being operable using electric power supplied from the fuel cell unit, the connection detecting module being powered by the power source module; and
   a control module configured to notify a user of the abnormal state, by using the LED, when the sensing module has sensed the abnormal state and the connection detecting module has detected a connection with the electronic apparatus.

2. The fuel cell unit according to claim 1, wherein the control module notifies the electronic apparatus that the abnormal state has been sensed, when the sensing module has sensed the abnormal state and the connection detecting module has detected the connection with the electronic apparatus.

3. The fuel cell unit according to claim 1, wherein the sensing module senses whether or not an inclination of the fuel cell unit has exceeded a predetermined angle, and the control module notifies the user that the inclination has exceeded the predetermined angle when the sensing module determines that the inclination of the fuel cell unit has exceeded the predetermined angle.

4. The fuel cell unit according to claim 1, wherein the sensing unit determines whether or not a temperature at an activation of the fuel cell falls in a predetermined temperature range, and the display unit notifies the user that the temperature does not fall in the predetermined temperature range when the sensing unit determines that the temperature at the activation of the fuel cell does not fall in the predetermined temperature range.

5. The fuel cell unit according to claim 1, wherein the sensing unit determines whether or not a temperature during an operation of the fuel cell falls in a predetermined temperature range, and the display unit notifies the user that the temperature does not fall in the predetermined temperature range when the sensing unit determines that the temperature during the operation of the fuel cell does not fall in the predetermined temperature range.

6. The fuel cell unit according to claim 1, wherein the fuel cell has a power generating portion and an auxiliary mechanism for supplying fuel to the power generating portion, and
   the sensing unit senses whether or not the auxiliary mechanism has stopped, and the display unit notifies the user that the auxiliary mechanism has stopped when the sensing unit determines that the auxiliary mechanism has stopped.

7. The fuel cell unit according to claim 1, wherein the fuel cell has a mixing tank for mixing fuel used for power generation with water, and
   the sensing unit senses whether or not an amount of liquid in the mixing tank falls in a predetermined capacity range, and the display unit notifies the user that the amount of liquid does not fall in the predetermined capacity range when the sensing unit determines that the amount of liquid in the mixing tank does not fall in the predetermined capacity range for a predetermined time or longer continuously.

8. The fuel cell unit according to claim 1, further comprising:
   a fuel tank installing portion which allows a fuel tank for storing fuel used for power generation in the fuel cell to be installed and removed, wherein
   the sensing unit senses whether or not the fuel tank has been installed in the fuel tank installing portion, and the display unit notifies the user that the fuel tank has not been installed in the fuel tank installing portion when the sensing unit determines that the fuel tank has not been installed in the fuel tank installing portion.

9. The fuel cell unit according to claim 1, further comprising:
   a fuel tank for storing fuel for the fuel cell, wherein
   the sensing unit senses whether or not a remaining amount of fuel in the fuel tank has fallen below a predetermined value, and the display unit notifies the user that the remaining amount has fallen below the predetermined value when the sensing unit determines that the remaining amount of fuel in the fuel tank has fallen below the predetermined value.

10. The fuel cell unit according to claim 1, wherein the LED is operable when the connection detecting module has detected an absence of a connection with the electronic apparatus.

11. A fuel cell unit comprising:
    a fuel cell;
    an LED provided at the fuel cell unit and powered by a power source module provided in the fuel cell unit the power source module including the fuel cell and a secondary cell;
    a sensing module configured to sense an abnormal state of the fuel cell;
    a connection detecting module configured to detect a presence or absence of a connection with an electronic apparatus, the electronic apparatus being operable using electric power supplied from the power source module; and
    a control module configured to notify a user of the abnormal state, by using the LED, when the sensing module has sensed the abnormal state and the connection detecting module has detected a connection with the electronic apparatus.

* * * * *